United States Patent
Dellock et al.

(10) Patent No.: US 10,077,012 B2
(45) Date of Patent: Sep. 18, 2018

(54) LOCALIZED SILICONE HEAT SHIELDING FOR EXTENSION DASH PANELS

(71) Applicant: Ford Global Technologies, LLC, Dearborn, MI (US)

(72) Inventors: Paul Kenneth Dellock, Northville, MI (US); Stuart C. Salter, White Lake, MI (US); Talat Karmo, Waterford, MI (US); Brian Siler, Richmond, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 15/351,491

(22) Filed: Nov. 15, 2016

(65) Prior Publication Data

US 2018/0134236 A1 May 17, 2018

(51) Int. Cl.
G10K 11/168 (2006.01)
B60R 13/08 (2006.01)
(Continued)

(52) U.S. Cl.
CPC ...... *B60R 13/0846* (2013.01); *B29C 44/1271* (2013.01); *B29C 44/3442* (2013.01); *B29C 45/0001* (2013.01); *B29C 45/02* (2013.01); *B29C 45/07* (2013.01); *B60K 37/00* (2013.01); *G10K 11/168* (2013.01); *B29C 44/0461* (2013.01); *B29C 44/06* (2013.01); *B29C 44/08* (2013.01); *B29C 44/42* (2013.01); *B29K 2083/00* (2013.01); *B29K 2101/10* (2013.01); *B29K 2101/12* (2013.01);
(Continued)

(58) Field of Classification Search
CPC ............ B60R 13/0846; B29C 44/1271; B29C 44/3442; B29C 45/0001; B29C 45/02; B29C 45/07; B60K 37/00; B60K 2350/40; G10K 11/168; B29K 2105/04; B29K 2995/0002
USPC ......................................................... 181/294
See application file for complete search history.

(56) References Cited

U.S. PATENT DOCUMENTS 5,094,318 A * 3/1992 Maeda ...................... B32B 7/02
181/290
7,070,848 B2 * 7/2006 Campbell ............. B60R 13/083
181/284
(Continued)

FOREIGN PATENT DOCUMENTS

DE 102004050649 A1 5/2005
DE 102013015964 A1 3/2014
(Continued)

*Primary Examiner* — Forrest M Phillips
(74) *Attorney, Agent, or Firm* — Jason Rogers; Price Heneveld LLP

(57) ABSTRACT

A method for making an insulated vehicle extension dash panel includes injection molding an extension dash panel from a structural polymer. The method further includes adding a plurality of components to a mixer to form an insulating foaming layer. The plurality of components includes a two-part liquid silicone compound, a catalyst, and a foaming agent. A screw is then coupled to the mixer and the insulating foaming layer is injection molded to an inner face of the extension dash panel. The insulating foaming layer is then cured to the inner face of the extension dash panel to form the insulated vehicle extension dash panel.

20 Claims, 5 Drawing Sheets

(51) Int. Cl.

| | | |
|---|---|---|
| *B29C 44/12* | (2006.01) | |
| *B29C 44/34* | (2006.01) | |
| *B29C 45/00* | (2006.01) | |
| *B29C 45/02* | (2006.01) | |
| *B29C 45/07* | (2006.01) | |
| *B60K 37/00* | (2006.01) | |
| B29K 83/00 | (2006.01) | |
| B29K 105/04 | (2006.01) | |
| B29L 31/30 | (2006.01) | |
| B29K 105/00 | (2006.01) | |
| B29C 44/04 | (2006.01) | |
| B29C 44/06 | (2006.01) | |
| B29C 44/08 | (2006.01) | |
| B29C 44/42 | (2006.01) | |
| B29K 101/10 | (2006.01) | |
| B29K 101/12 | (2006.01) | |
| B29K 105/24 | (2006.01) | |

(52) U.S. Cl.
CPC .. *B29K 2105/0014* (2013.01); *B29K 2105/04* (2013.01); *B29K 2105/24* (2013.01); *B29K 2995/0002* (2013.01); *B29K 2995/0097* (2013.01); *B29L 2031/3008* (2013.01); *B60K 2350/40* (2013.01)

(56) References Cited

U.S. PATENT DOCUMENTS

| | | | | |
|---|---|---|---|---|
| 7,588,121 | B2* | 9/2009 | Sasaki | C08G 18/4072 |
| | | | | 180/175 |
| 2011/0253474 | A1* | 10/2011 | Castagnetti | B60R 13/0815 |
| | | | | 181/290 |
| 2014/0050886 | A1* | 2/2014 | Burgin | B32B 5/18 |
| | | | | 428/138 |
| 2014/0097035 | A1* | 4/2014 | Starling | B32B 5/22 |
| | | | | 181/290 |
| 2015/0307037 | A1* | 10/2015 | Kim | B60R 13/0838 |
| | | | | 181/290 |

FOREIGN PATENT DOCUMENTS

| | | |
|---|---|---|
| JP | 2009208009 A | 9/2009 |
| SE | 507286 C2 | 5/1998 |

\* cited by examiner

LOCALIZED SILICONE HEAT SHIELDING FOR EXTENSION DASH PANELS

FIELD OF THE INVENTION

The present invention generally relates to extension dash panels for a vehicle, and more specifically, an insulated vehicle extension dash panel having a localized silicone heat shielding panel.

BACKGROUND OF THE INVENTION

Vehicle operators and consumers express the need and desire for reduced levels of noise such as road noise, engine noise, vibrations, etc. within a vehicle passenger compartment. Accordingly, sound attenuating materials and paneling are conventionally used throughout the vehicle such as in the dashboard and floor panels to reduce the noise, vibration, and harshness (NVH) in the vehicle passenger compartment.

In addition to materials and paneling that reduce the levels of noise in a passenger cabin, these materials may also be required to provide efficient thermal insulation. When paneling is used in the dashboard to separate the engine compartment and the passenger compartment, thermal insulating materials that can withstand the high temperatures emitted from the engine are required. The design of such noise and temperature insulating panels can be difficult since it can be a careful balance to engineer panels that offer proper dual insulating capabilities. For example, many foam materials that would make a good sound absorber will readily melt at the elevated temperatures found in an engine compartment.

As fuel economy and emission requirements continually become more restrictive for original equipment manufacturers (OEMs), the reduction of displacement in engines is becoming common place. In many instances, OEMS are using turbo chargers to increase both the horse power and torque of smaller displacement engines. A consequence of using smaller, higher revving engines is they often generate more heat, especially heat that is generated by the turbo chargers. In many instances, the highest amount of heat generated in an engine compartment is found within the first fifteen minutes after the engine has been turned off and the air circulation and cooling systems have been deactivated. These conditions require the need for paneling and lower cowl structures such as extension dash panels to offer both noise and thermal insulation for the occupants in the passenger compartment.

SUMMARY OF THE INVENTION

According to one aspect of the present invention, a method for making an insulated vehicle extension dash panel is provided. The method includes injection molding an extension dash panel from a structural polymer and adding a plurality of components to a mixer to form an insulating foaming layer. The plurality of components includes a two-part liquid silicone compound, a catalyst, and a foaming agent. The method for making an insulated vehicle extension dash panel further includes injection molding the insulating foaming layer to an inner face of the extension dash panel and curing the insulating foaming layer.

According to another aspect of the present invention, a method for making an insulated vehicle panel is provided. The method includes injection molding an extension dash panel from a structural polymer. The method additionally includes injection molding an insulating foaming layer to an inner face of the extension dash panel. The insulating foaming layer includes a two-part liquid silicone compound, a catalyst, and a foaming agent. The method for making an insulated vehicle panel further includes curing the insulating foaming layer.

According to another aspect of the present invention, an insulated extension dash panel for a vehicle is provided. The insulated extension dash panel includes a thermoplastic extension dash panel and an insulating foam layer coupled to an inner face of the thermoplastic extension dash panel. The insulating foam layer has a melting point greater than 275° C. and a thickness from 5 mm to 20 mm.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
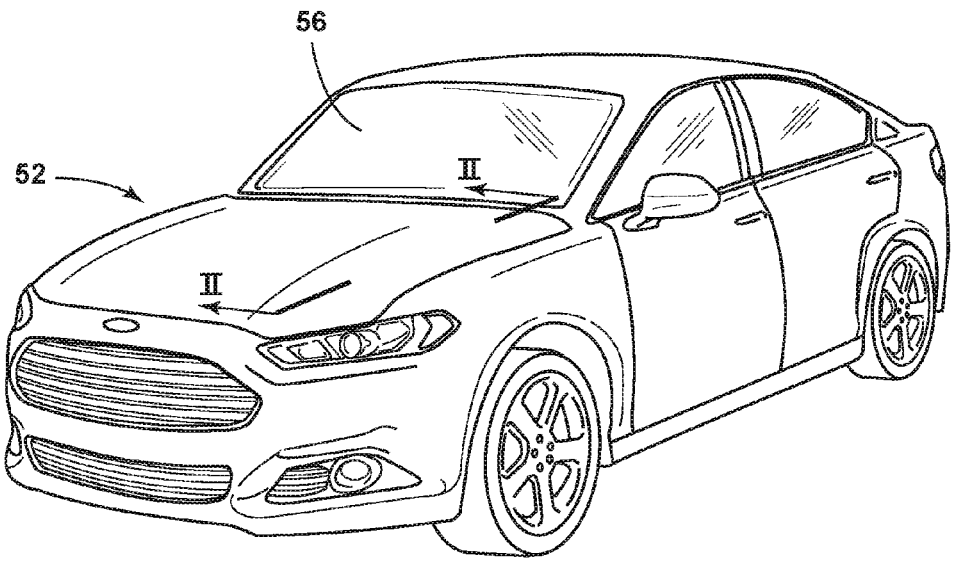
FIG. 1 is a perspective view of a vehicle.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-8, reference numeral 10 generally designates an insulated vehicle extension dash panel. A method for making the insulated vehicle extension dash panel 10 includes injection molding an extension dash panel 14 from a structural polymer 18. The method further includes adding a plurality of components 22 to a mixer 30 to form an insulating foaming layer 26 wherein the plurality of components 22 include a two-part liquid silicone compound 34, a catalyst 38, and a foaming agent 42. A screw 44 is then coupled to the mixer 30 and the insulating foaming layer 26 is injection molded to an inner face 48 of the extension dash panel 14. The insulating foaming layer 26 is then cured to the inner face 48 of the extension dash panel 14 to form the insulated vehicle extension dash panel 10.

Referring to FIG. 1, a vehicle 52 is shown with a windshield 56 to provide perspective. Although the vehicle 52 shown is a car, the type of vehicle 52 is not meant to be limiting and the vehicle 52 could additionally be, for example, a minivan, truck, commercial vehicle, or any other motorized vehicle.

Figure 2:
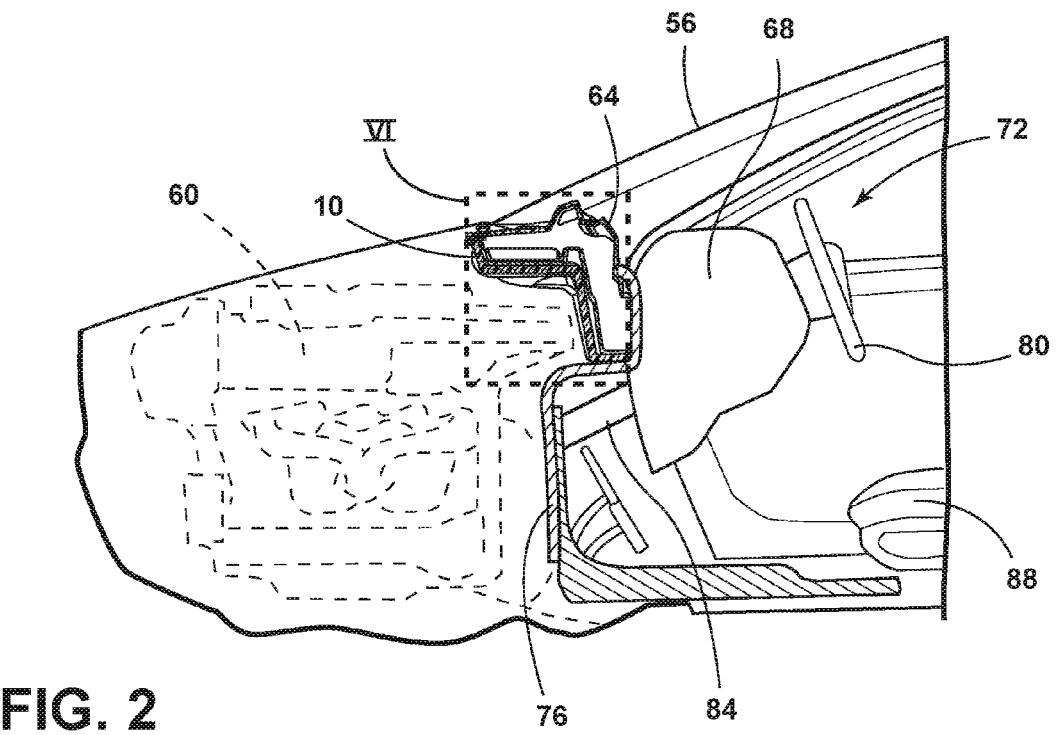
FIG. 2 is a schematic cross-sectional view of the vehicle of FIG. 1 taken along the line II-II.

Referring now to FIG. 2, a cross-sectional view is shown of an engine compartment 60 and an interior space 72 of the vehicle 52. Separating the engine compartment 60 from the interior space 72 of the vehicle 52 is a dash 64, the insulated vehicle extension dash panel 10, and a firewall 76. A steering wheel 80 is mounted in an instrument panel 68 of the interior space 72 with a steering column 84 projecting down and away from the steering wheel 80 into the engine compartment 60. The windshield 56 partially encloses the interior space 72 that additionally contains a plurality of seating assemblies 88.

The use and method for making the insulated vehicle extension dash panel 10 disclosed herein represents one of a variety of different potential uses that can be implemented with this type of sound and heat insulating panels. For example, in some embodiments, many different insulating vehicle panels can provide sound and heat insulation depending on the panel's use. Other uses or locations for these insulated vehicle panels having a localized heat and noise shielding panel can include, for example, a vehicle hood, engine compartment walls, exhaust system walls, HVAC system, vehicle doors, quarter panels, storage compartments, the roof, or any other areas where a reduction in heat and/or noise is desired.

Figure 3:
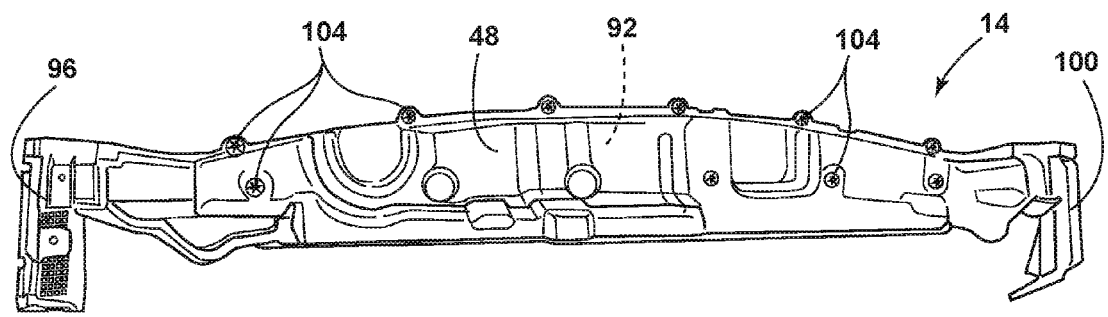
FIG. 3 is a bottom view of an extension dash panel according to one aspect of the current disclosure.

Referring now to FIG. 3, a bottom view of the extension dash panel 14 is represented. The extension dash panel 14 has the inner face 48 and an outer face 92 in addition to a left side member 96 and a right side member 100. A plurality of fasteners 104 can be molded into the extension dash panel 14 to offer a means of coupling it to the dash 64 or other paneling and/or structures between the engine compartment 60 and the interior space 72, as shown in FIG. 2.

The extension dash panel 14 may be injection molded from the structural polymer 18. In some embodiments, the structural polymer 18 may include a thermoset polymer or a thermoplastic polymer. Some non-limited examples of thermoplastic polymers that may be used to injection mold the extension dash panel 14 are polypropylene, polyethylene, nylon, acrylonitrile butadiene styrene (ABS), poly(methyl methacrylate), polycarbonate, polyvinyl chloride, and combinations thereof. Some non-limited examples of thermoset polymers that may be used for the extension dash panel 14 are epoxy resins, polyurethane resins, rubber, phenol-formaldehyde resins, melamine resins, and combinations thereof.

Figure 4:
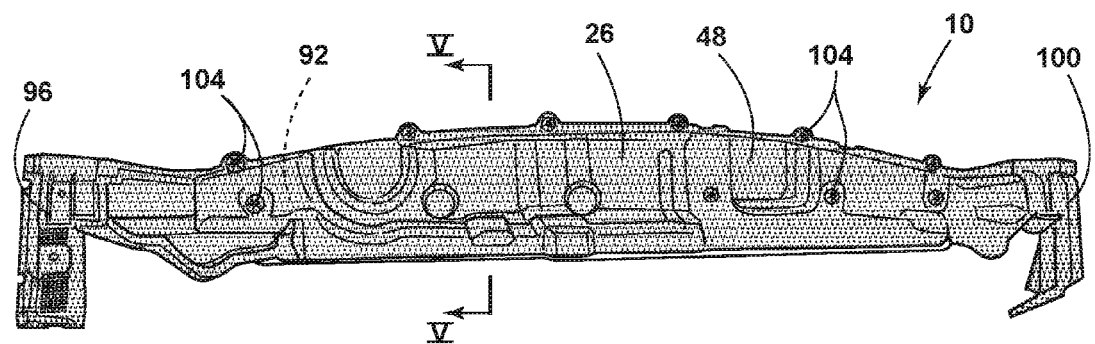
FIG. 4 is a bottom view of the extension dash panel of FIG. 3 with a silicone foam layer coupled according to one aspect of the current disclosure.

Referring now to FIG. 4, the extension dash panel 14 is shown coupled to the insulating foaming layer 26 to form the insulated vehicle extension dash panel 10. Each of the structural features present on the extension dash panel 14 (FIG. 3) such as the plurality of fasteners 104, the left and right side members 96, 100, and the inner and outer faces 48, 92 should all remain as features on the insulated vehicle extension dash panel 10.

The insulating foaming layer 26 is made from the two-part liquid silicone compound 34, the catalyst 38, and the foaming agent 42. The two-part liquid silicone compound 34 is made from a first part 34a and a second part 34b where the functionality of the first and second parts 34a, 34b are designed to react with the functionality of the other respective part to form an extended polymer or crosslinked polymer network. In some embodiments, the first part 34a is a silanol or a silyl vinyl group and the second part 34b is a silyl halide or a Si—H. The designation of the first and second parts 34a, 34b is merely for reference and the respective functional groups of the first and second parts 34a, 34b are restricted by the requirement that they are able to react with each other to form an extended polymer or crosslinked structure. The two-part liquid silicone compound 34 used in the embodiments of the present invention can be a monomer, oligomer, prepolymer, or polymer with or without an additional reinforcing filler. Furthermore, the monomer, oligomer, prepolymer, or polymer can include repeating SiO units making up the polymer chain's backbone. One example of the silicone material is polydimethylsiloxane (PDMS). Another type of silicone material suitable for use in the present invention is one having hydrocarbon groups that lack aliphatic unsaturation. Yet another type of silicone material suitable for use in the present invention is one having functional groups, for example, alkenyl, halide, carboxylic, epoxy, hydroxyl, hydrogen, and maleic anhydride.

In some embodiments, the two-part liquid silicone compound 34 can have at least one alkenyl group having at least two carbon atoms in their molecules. Examples of these alkenyl groups include, but are not limited to, vinyl, allyl, butenyl, pentenyl, hexenyl, and decenyl. The alkenyl functionality can be located at any position of the silicon atom in the polymer structure, including one or both terminals of the polymer structure. The remaining, non-alkenyl, silicon-bonded organic groups in the two-part liquid silicone compound 34 may be selected, for example, from a Si—H, a hydrocarbon, or a halogenated-hydrocarbon groups that contain no aliphatic unsaturation. Non-limiting examples include alkyl groups such as methyl, ethyl, propyl, butyl, pentyl, and hexyl; cycloalkyl groups such as cyclohexyl and cycloheptyl; aryl groups such as phenyl, tolyl, xylyl; aralkyl groups such as benzyl and phenethyl; and halogenated alkyl groups such as 3,3,3-trifluoropropyl and chloromethyl.

Specific examples of suitable silicones for use in the present invention include, but are not limited to, trimethylsiloxy-endblocked dimethylsiloxane-methylhexenylsiloxane copolymers, dimethylhexenlylsiloxy-endblocked dimethylsiloxane-methylhexenylsiloxane copolymers, trimethylsiloxy-endblocked dimethylsiloxane-methylvinylsiloxane copolymers, trimethylsiloxy-endblocked methylphenylsiloxane-dimethylsiloxane-methylvinylsiloxane copolymers, dimethylvinylsiloxy-endblocked dimethylpolysiloxanes, dimethylvinylsioxy-endblocked dimethylsiloxane-methylvinylsiloxane copolymers, dimethylvinylsiloxy-endblocked methylphenylpolysiloxanes, dimethylvinylsiloxy-endblocked methylphenylsiloxane-dimethylsiloxane-methylvinylsiloxane copolymers, and similar copolymers wherein at least one end group is dimethyl-hydroxysiloxy.

The catalyst 38 used to make the insulating foaming layer 26 can act as a polymerizing or crosslinking agent and can include, but is not limited to, organic peroxides, sulfur compounds, precious metals, or precious metal-containing materials. Precious metals that can be used as the catalyst 38 include: rhodium, ruthenium, palladium, osmium, irridium, or platinum. In some embodiments, the catalyst 38 can be a platinum catalyst and/or a platinum metal complex. Other catalysts 38 that can be used as crosslinking initiators are radical initiators, such as organic peroxides and organic azo compounds or phenolic crosslinking initiators. Examples of suitable crosslinking agents include aliphatic peroxides, aromatic peroxides, or mixtures thereof. Primary, secondary, or tertiary peroxides can be used. Also, peroxides containing more than one peroxy group can be used, such as 2,5-bis-(t-butylperoxy)-2,5-dimethyl hexane and 1,4-bis-(t-butylperoxyisopropyl)-benzene. Also, peroxides that are either symmetrical or asymmetric can be used, such as t-butylperbenzoate and t-butylcumylperoxide. Additionally, peroxides having carboxy groups also can be used. Decomposition of peroxides within the scope of the present invention can be brought by applying thermal energy, radiation energy, shear, reactions with other chemical ingredients, or combinations thereof. Homolytically decomposed peroxide, heterolytically decomposed peroxide, or a mixture thereof can be used to promote crosslinking reactions with compositions within the scope of this invention.

The foaming agent 42 used to make the insulating foaming layer 26 is a material that facilitates formation of foam as the two-part liquid silicone compound 34 is set and cured. In some embodiments, the foaming agent 42 may be a diazo or azide type compound such as 2,2'-azodi(isobutyronitrile), azobisisobutyronitrile, PERKADOX AIBN-PD, or ME 800. In other embodiments, the foaming agent 42 can be an azobisisobutyronitrile, a peroxide, an azo compound, or a combination thereof.

Figure 5:
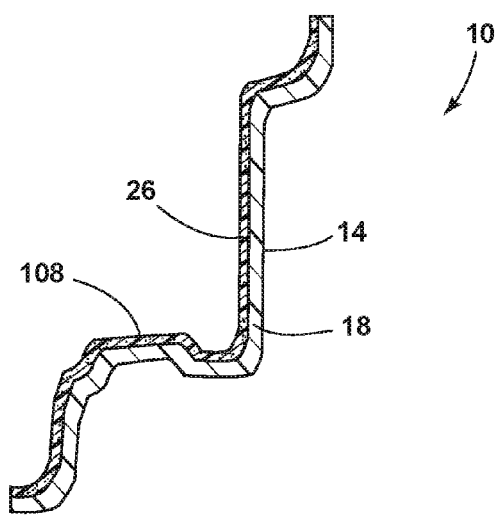
FIG. 5 is a cross-sectional view of an insulated extension dash panel of FIG. 4 taken along the line V-V.
Figure 6:
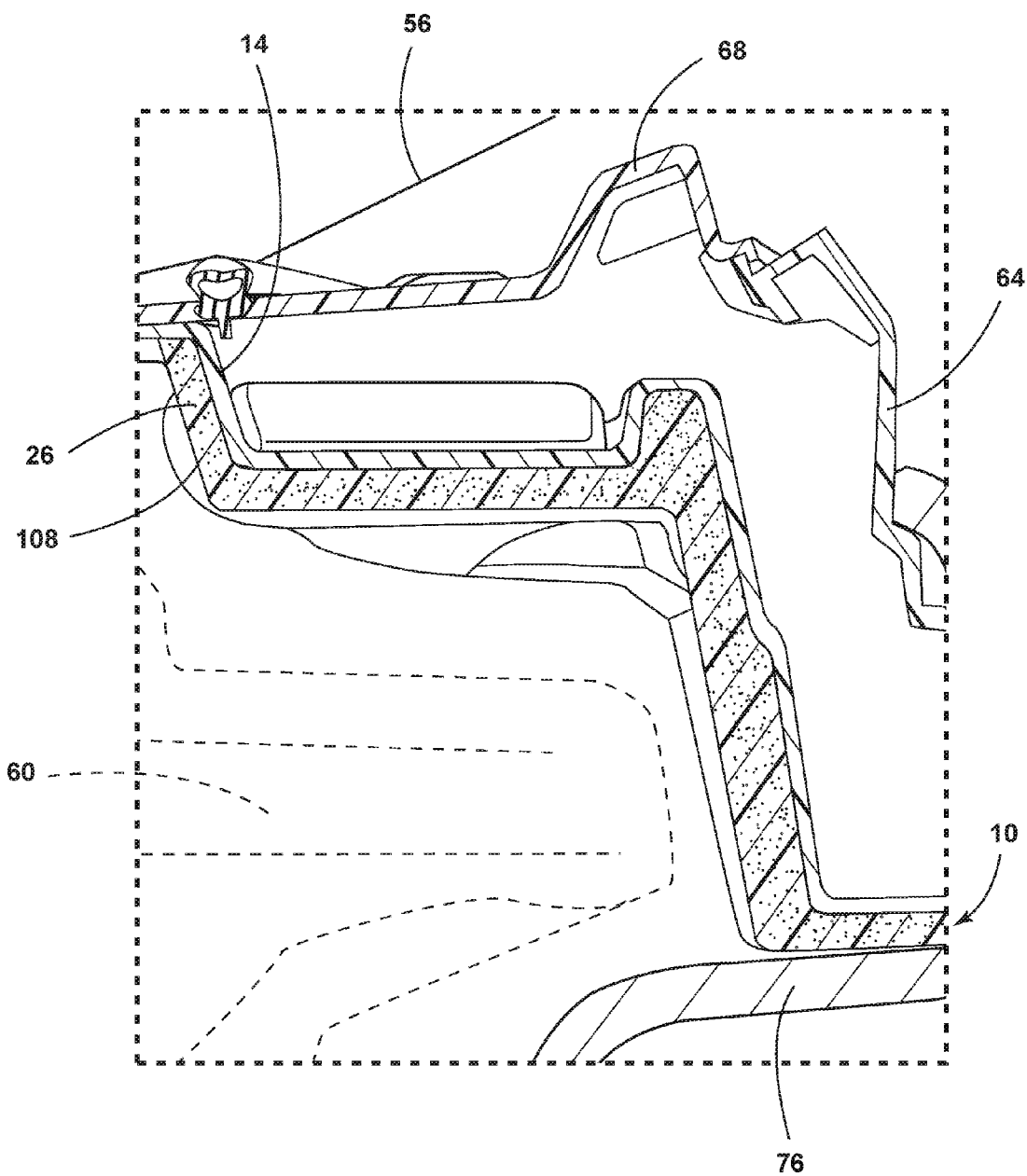
FIG. 6 is a partially fragmentary isometric view of the insulated extension dash panel of FIG. 2.

Referring now to FIGS. 5-6, a cross-sectional view of the insulated extension dash panel 10 is shown where an inner side of the insulated extension dash panel 10 is positioned facing the engine compartment 60 and an outer side of the insulated extension dash panel 10 faces the dash 64 and the interior space 72 (FIG. 2). The extension dash panel 14, the insulating foaming layer 26, and a silicone skin layer 108 make up the individual portions of the insulated extension dash panel 10. The heat and noise produced by the engine compartment 60 must cross the insulated vehicle extension dash panel 10 in order to reach the interior space 72. As parts of the insulated vehicle extension dash panel 10, the extension dash panel 14, the insulating foaming layer 26, and the silicone skin 108 provide both a thermal barrier and a NVH barrier. The insulated vehicle extension dash panel 10 may be coupled to the dash 64, the windshield 56, and/or the instrument panel 68.

The thickness of the insulating foaming layer 26 can be varied depending on the composition of the two-part liquid silicone compound and the amount of noise and/or heat to be removed. In some embodiments, the insulating foam layer 26 has a thickness from about 1 mm to about 25 mm, about 5 mm to about 15 mm, about 5 mm to about 10 mm, or has a thickness of about 25 mm, about 20 mm, about 15 mm, about 10 mm, about 5 mm, about 4 mm, about 3 mm, about 2 mm, or about 1 mm. In addition, the insulating foam layer 26 can have a melting point greater than about 275° C., greater than about 325° C., greater than about 350° C., or greater than about 375° C. The thickness of the insulating foam layer 26 may be associated with any desired melting point, for example, the insulating foam layer 26 with a thickness from 5 mm to 20 mm can have a melting point greater than about 275° C., greater than about 325° C., greater than about 350° C., or greater than about 375° C.

In some embodiments, the insulated extension dash panel 10 can reduce the peak temperature of the engine compartment by at least 90%, at least 80%, at least 70%, at least 60%, at least 50%, at least 40%, at least 30%, at least 20%, or by at least 10%.

The insulating foam layer 26 of the insulated vehicle extension dash panel 10 has the ability to additionally function as a NVH management layer and/or material. The insulating foam layer 26 described herein can be used as a lightweight and affordable option to insulate and reduce the noise, vibration, and harshness NVH experienced by an occupant in the vehicle 52. In some embodiments, the insulating foam layer 26 of the insulated vehicle extension dash panel 10 may have a noise reduction coefficient (NRC), the percentage of sound that a surface absorbs and does not reflect or transmit, from about 5% to about 99%, from about 25 to about 95%, from about 50% to about 95%, from about 75% to about 95%, or has a NRC of about 95%, about 90%, about 85%, about 80%, about 75%, about 70%, about 65%, about 60%, about 50%, about 40%, or about 25%.

Figure 7A:
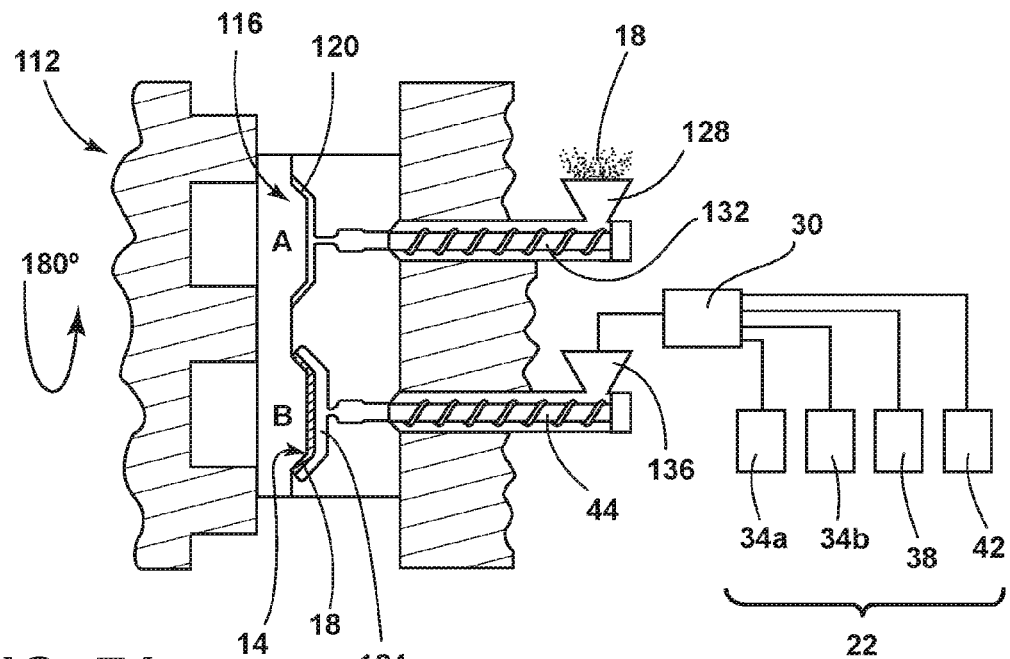
FIG. 7A is a partially schematic cross-sectional view of a two-shot rotational injection molding machine according to one aspect of the current disclosure.
Figure 7B:
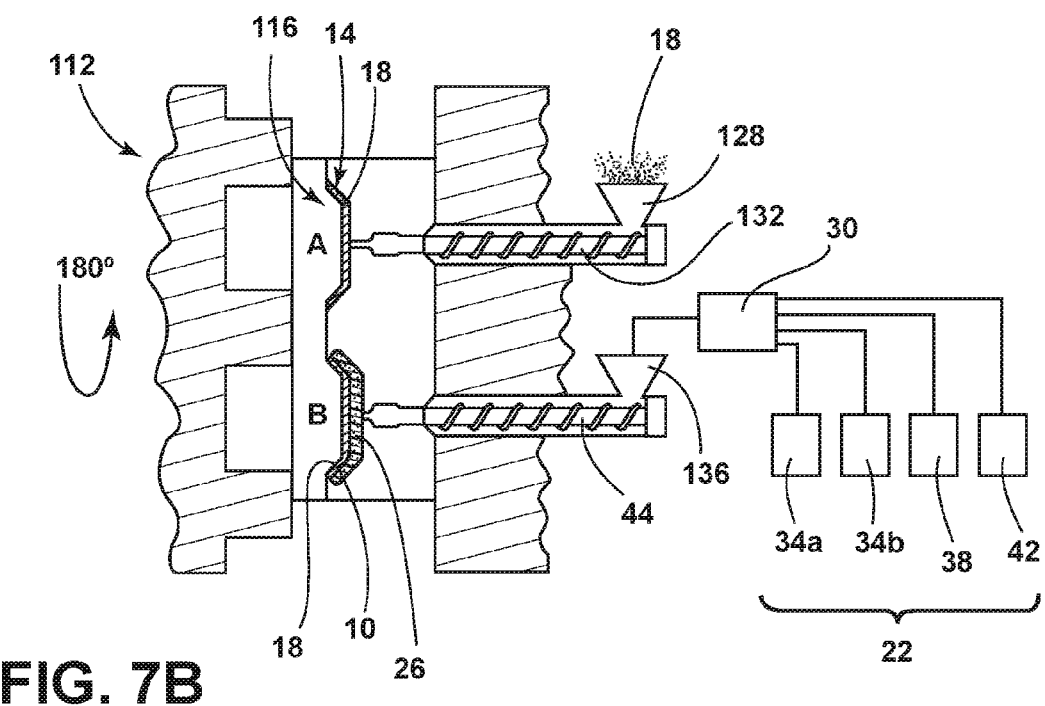
FIG. 7B is the partially schematic cross-sectional view of the two-shot rotational injection molding machine shown in FIG. 7A after injection.
Figure 8:
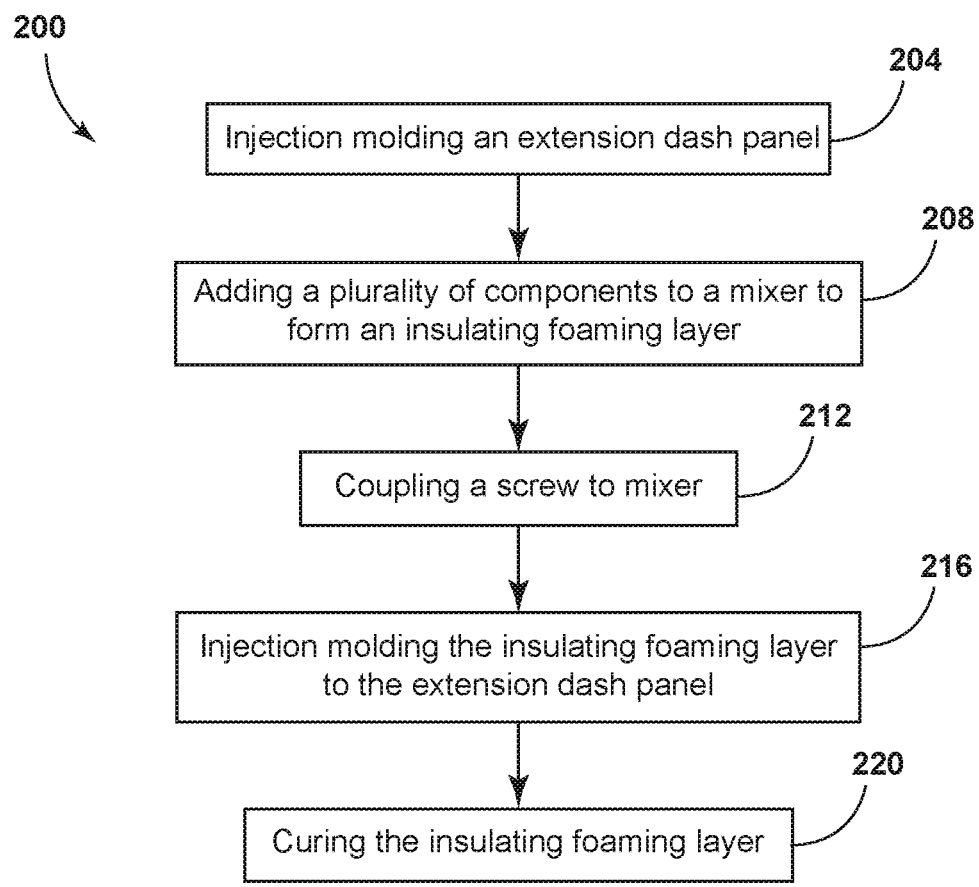
FIG. 8 is a flow diagram of a method for making an insulated vehicle extension dash panel.

Referring to FIGS. 7A-7B, a two-shot rotational injection molding machine 112 may be used for making the insulated vehicle extension dash panel 10. Due to fabrication and assembly steps being performed inside the molds, molded multi-material objects allow significant reduction in assembly operations and production cycle times. Furthermore, the product quality can be improved, and the possibility of manufacturing defects and total-manufacturing costs can be reduced. In multi-material injection molding, multiple different materials are injected into a multi-stage mold. The sections of the mold that are not to be filled during a molding stage are temporally blocked. After the first injected material sets, then one or more blocked portions of the mold are opened and the next material is injected. This process continues until the required multi-material part is created.

According to one embodiment, a multi-shot molding process is used to form the extension dash panel 14 of the insulated vehicle extension dash panel 10. The extension dash panel 14 is formed through a first injection-molding step and is made from the structural polymer 18. In this step, the structural polymer 18 is sped through a first addition member 128 that introduces the structural polymer 18 to a first injection screw 132 that both melts and delivers the structural polymer 18 to a first open mold space 120 of a mold 116.

The insulating foaming layer 26 may be formed from the plurality of components 22 including the first part 34*a* and the second part 34*b* of the two-part liquid silicone compound 34, the catalyst 38, and the foaming agent 42 that are molded over the extension dash panel 14 to provide the heat and noise insulation during a second injection-molding step. The two-part liquid silicone compound 34, the catalyst 38, and the foaming agent 42 are each added to the mixer 30 that is fed to the screw 44 or second injection screw 44 through a second addition member 136. The insulating foaming layer 26 is injected into a second open mold space 124 to be molded directly to the extension dash panel 14. Upon completion of the dual injection steps, the mold 116 retracts back and rotates 180 degrees so the extension dash panel 14 made in the first open mold space 120 is positioned in the second open mold space 124 so the insulating foaming layer 26 may be coupled in the two step process.

According to the embodiments of FIGS. 7A-7B, the two-shot rotational injection molding machine 112 with the rotating mold 116 may be utilized to manufacture the insulated vehicle extension dash panel 10 described herein. However, it will be appreciated that any other process may be utilized for creating the two-layer insulated vehicle extension dash panel 10. In alternative embodiments, additional components may be added during any of the injection steps, or successively added in additional injections thereby adhering more components to the insulated vehicle extension dash panel 10. Additionally, or alternatively, the extension dash panel 14 may be attached to the insulating foaming layer 26 during a successive injection molding step. In some embodiments, the injection molding steps are both performed using the two-shot rotational molding instrument 112.

The injection and/or curing step may performed at a temperature ranging from about 150° C. to about 275° C., from about 150° C. to about 250° C., or from about 170° C. to about 225° C. The injection molding steps can maintain a cavity pressure ranging from about 100 bar to about 1,000 bar, from about 250 bar to about 900 bar, or from about 250 bar to about 750 bar.

Referring now to FIGS. 1-8, the method 200 for making the insulated vehicle extension dash panel 10 includes, injection molding the extension dash panel 14 (step 204). The method includes adding the plurality of components 22 to the mixer 30 to form the insulating foaming layer 26 (step 208). The method may further include coupling the screw 44 to the mixer 30 (step 212). The method also includes injection molding the insulating foaming layer 26 to the extension dash panel 14 (step 216). The method also includes curing the insulating foaming layer 26 (step 220). As described herein, the order, process, and description of these steps may be varied.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method for making an insulated vehicle extension dash panel, the method comprising:
   injection molding an extension dash panel from a structural polymer;
   adding a plurality of components to a mixer to form an insulating foaming layer wherein the plurality of components comprise:
   a two-part liquid silicone compound;
   a catalyst; and
   a foaming agent;
   injection molding the insulating foaming layer to an inner face of the extension dash panel; and
   curing the insulating foaming layer.

2. The method of claim 1, wherein the structural polymer is a thermoset polymer or a thermoplastic polymer.

3. The method of claim 1, wherein the two-part liquid silicone compound has a first part and a second part, wherein the first part comprises a silanol or a silyl vinyl group and wherein the second part comprises a silyl halide or a Si—H group.

4. The method of claim 1, wherein the catalyst comprises a platinum catalyst.

5. The method of claim 1, wherein the foaming agent comprises an azobisisobutyronitrile, a peroxide, an azo compound, or a combination thereof.

6. The method of claim 1, wherein the curing step is performed at a temperature from 170° C. to 225° C.

7. The method of claim 1, wherein the injection molding steps are both performed using a two-shot rotational molding instrument.

8. The method of claim 1, wherein the injection molding steps maintain a cavity pressure from about 250 bar to about 750 bar.

9. A method for making an insulated vehicle panel, the method comprising:

injection molding an extension dash panel from a structural polymer;

injection molding an insulating foaming layer to an inner face of the extension dash panel, wherein the insulating foaming layer comprises:
- a two-part liquid silicone compound;
- a catalyst; and
- a foaming agent; and curing the insulating foaming layer.

10. The method of claim 9, wherein the structural polymer is a thermoset polymer or thermoplastic polymer.

11. The method of claim 9, wherein the two-part liquid silicone compound has a first part and a second part wherein the first part comprises a silanol or a silyl vinyl group and the second part comprises a silyl halide or a Si—H group.

12. The method of claim 9, wherein the catalyst is a platinum catalyst.

13. The method of claim 9, wherein the foaming agent comprises an azobisisobutyronitrile, a peroxide, an azo compound, or a combination thereof.

14. The method of claim 9, wherein the curing step is performed at a temperature from about 170° C. to about 225° C.

15. The method of claim 9, wherein the injection molding steps are both performed using a two-shot rotational molding instrument.

16. The method of claim 9, wherein the injection molding steps maintain a cavity pressure from about 250 bar to about 750 bar.

17. An insulated extension dash panel for a vehicle, comprising:
- a thermoplastic extension dash panel; and
- an insulating foam layer coupled to an inner face of the thermoplastic extension dash panel, wherein the insulating foam layer has a melting point greater than about 275° C. and a thickness in the range of about 5 mm to 20 mm.

18. The insulated extension dash panel for a vehicle of claim 17, wherein the insulating foam layer has a thickness from about 5 mm to about 15 mm.

19. The insulated extension dash panel for a vehicle of claim 17, wherein the insulated extension dash panel reduces the peak temperature of the engine compartment at least 50%.

20. The insulated extension dash panel for a vehicle of claim 17, wherein the insulating foam layer functions as a NVH management material.

* * * * *